United States Patent [19]

Neuhaus et al.

[11] Patent Number: 5,426,124

[45] Date of Patent: Jun. 20, 1995

[54] PROCESS FOR THE PRODUCTION OF MOLDINGS OF POLYURETHANE FOAMS

[75] Inventors: Alfred Neuhaus, Leverkusen; Peter Haas, Haan; Majid Daneshvar, Bergisch Gladbach, all of Germany

[73] Assignees: Bayer Aktiengesellschaft, Leverkusen, Germany; Miles Inc., Pittsburgh, Pa.

[21] Appl. No.: 207,316

[22] Filed: Mar. 7, 1994

[30] Foreign Application Priority Data

Mar. 9, 1993 [DE] Germany ............... 43 07 384.0

[51] Int. Cl.⁶ .................................. C08J 9/34
[52] U.S. Cl. ........................... 521/51; 521/130
[58] Field of Search ..................... 521/51, 130

[56] References Cited

U.S. PATENT DOCUMENTS

| | | | |
|---|---|---|---|
| 4,417,002 | 11/1983 | Liessem | 521/128 |
| 4,473,666 | 9/1984 | Casati et al. | 521/115 |
| 4,572,740 | 2/1986 | Kretzschmann et al. | 106/122 |
| 5,025,039 | 6/1991 | Neuhaus et al. | 521/51 |
| 5,064,871 | 11/1991 | Sciangola | 521/124 |
| 5,143,945 | 9/1992 | Bodnar et al. | 521/130 |
| 5,162,385 | 11/1992 | Hartwig et al. | 521/118 |
| 5,374,486 | 12/1994 | Clatty et al. | 521/51 |

FOREIGN PATENT DOCUMENTS 1277471 11/1990 Canada .
3607447 9/1987 Germany .
1285224 8/1972 United Kingdom .

Primary Examiner—Morton Foelak
Attorney, Agent, or Firm—Joseph C. Gil; N. Denise Brown

[57] ABSTRACT

The present invention relates to a process for the production of polyurethane foam moldings having a compact surface skin and a density of at least 150 kg/m³ comprising foaming a polyurethane-forming starting mixture inside a mold. The starting mixture comprises organic blowing agents which correspond to one or both of the following general formulas:

$$HOOC-R-COOH \tag{I}$$

wherein: R represents a $CH_2$ group or a $CH=CH$ group;

and $$HOOCCH_2\underset{\underset{COOR^2}{|}}{C}(OH)CH_2COOR^1 \tag{II}$$

wherein: $R^1$ and $R^2$ independently of one another represent either a hydrogen atom or a $C_{1-6}$ alkyl radical wherein the hydrogen atoms may be partly substituted by OH groups.

13 Claims, No Drawings

PROCESS FOR THE PRODUCTION OF MOLDINGS OF POLYURETHANE FOAMS

BACKGROUND OF THE INVENTION

This invention relates to a process for the production of moldings of polyurethane foams having a compact surface wherein special organic carboxylic acids are used as blowing agents.

The production of moldings of polyurethane foams having a compact surface by in-mold foaming is known in principle (see, for example, German Auslegeschrift 1,196,864). It is carried out by foaming a reactive and foamable mixture of organic polyisocyanates, compounds containing isocyanate-reactive groups and the usual auxiliaries and additives in molds, wherein a larger quantity of the reaction mixture is introduced into the mold than is required for filling the mold by free foaming. It is possible, by suitable selection the starting components, more particularly in regard to their molecular weight and their functionality, to produce both flexible, semirigid, and rigid moldings. The compact outer skin is obtained on the one hand by introducing more foamable mixture into the mold than is required to fill the mold by free foaming and, on the other hand, by using blowing agents such as, for example, fluorocarbons, which condense on the inner wall of the mold under the prevailing temperature and pressure conditions so that the blowing reaction comes to a stop on the inner wall of the mold and a compact surface skin is formed.

In addition to water, chlorofluorocarbons or hydrogen chlorofluorocarbons are used as blowing agents in the production of polyurethane (PUR) foams. These conventional blowing agents have enabled a number of favorable properties to be obtained. In particular, fluorotrichloromethane enables a number of foams differing in their properties to be produced. However, the group of so-called chlorofluorocarbon blowing agents are problematical in ecological terms.

Attempts have been made to switch entirely to water as an alternative blowing agent. However, the use of water as a blowing agent for semirigid to flexible PUR foams with a compact outer skin presents problems which impose narrow limits on the use of water. Serious disadvantages for the satisfactory processing of water-blown moldings include flow behavior, closed cell structure, and the structure of the surface skin.

Problems arise with respect to flow behavior as the additional water greatly accelerates the increase in viscosity, so that the mixture of raw materials loses the necessary mobility. Accordingly, correspondingly large quantities of the reaction mixture have to be used to fill the mold.

The water-blown moldings have a tendency to develop a pronounced closed cell structure. This results in the buildup of pressure and ultimately in splitting of the moldings. For these reasons, narrow limits are imposed on the density of water-blown semirigid moldings. Thus, densities of only 500 to 600 kg/m³ may be regarded as critical on account of the hereinabove described effects, with water having been used in a quantity of 0.6 to 0.8 part by weight.

Problems are also seen in the structure of the compact surface skin when water is used as the blowing agent. In particular, water-blown semirigid moldings do not have a cell-free surface skin, so that an additional lacquer coating is required for practical applications.

Numerous blowing agents have previously been recommended. Thus, French Patent 2,509,317 uses formic acid and water for the production of flexible slabstock foams and rigid foams. European Patent Application 0,154,669 uses special amines and acids (e.g. formic acid) for the production of flexible foams. According to European Patent Application 372,292, carboxylic acids, preferably lactic acid, are used as blowing agents for the production of rigid foams having a compact surface skin.

These more recent, known blowing agents should be at least as good in their properties as the monofluorotrichloromethane previously used, and should form correspondingly good foams. Accordingly, the blowing agents must satisfy the following requirements:
a) high gas yield corresponding to a low density
b) problem-free flow
c) minimal increase in viscosity in the foaming reaction mixture
d) dimensionally stable moldings
e) high compression gradient without splitting
f) void-free surface
g) rapid reduction in pressure in the molding
h) safe decomposition products.

For various reasons, the solutions known from the prior art do not work for certain types of foams.

Thus, the formic acid used as blowing agent has a chain-terminating character and forms carbon monoxide as a decomposition product.

The blowing agents known from European Patent Application 372,292 present problems in the production of flexible moldings having a compact surface skin.

Accordingly, the problem addressed by the present invention was to provide a process which would enable moldings of polyurethane foams with a compact surface skin to be produced and which would not have any of the disadvantages mentioned hereinabove. This problem has been solved by the process according to the invention wherein certain organic carboxylic acids are used as blowing agents.

DESCRIPTION OF THE INVENTION

The present invention relates to a process for the production of polyurethane foam moldings having a compact surface and a density of at least 150 kg/m³ comprising foaming a reaction mixture that comprises
  a) a polyisocyanate component comprising at least one aromatic polyisocyanate,
  b) an isocyanate-reactive component comprising at least one organic compound containing at least two isocyanate-reactive groups,
  c) urethane- and urea-forming activators,
  d) organic blowing agents
inside a mold while maintaining an isocyanate index of 75 to 200 throughout the reaction, wherein said organic blowing agents correspond to one or both of the following general formulas:

HOOC—R—COOH  (I)

wherein: R represent a CH₂ group, or a CH═CH group;
or:

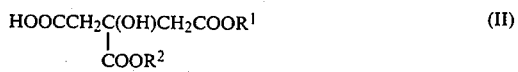
(II)

wherein: $R^1$ and $R^2$ independently of one another represent a hydrogen atom, or a $C_{1-6}$ alkyl radical wherein the hydrogen atoms may be partly substituted by OH groups.

The reaction mixture optionally comprises
e) other auxiliaries and additives, and
f) water.

A high gas yield, an unexpectedly rapid reduction in pressure inside the mold, and good skin formation in the outer zones are obtained when the reaction mixture contains compounds corresponding to formulae I and/or II.

Malonic acid, citric acid, citric acid propyl ester, citric acid hydroxypropyl ester, maleic acid or mixtures thereof are preferably used as blowing agents.

Compounds corresponding to formula II, wherein $R^1$ represents a $C_{1-6}$ alkyl radical wherein the hydrogen atoms may be partly substituted by OH groups, and $R^2$ represents a hydrogen atom, are preferably used as blowing agents.

The carboxylic acids suitable to be used as blowing agents d) may, of course, also be used in the form of their salts, more particularly in the form of their ammonium salts which may contain isocyanate-reactive groups.

The monoester citrates are preferably used as blowing agents.

It is also possible that derivatives of malonic acid such as, for example, dihydroxymalonic acid and tartronic acid and alkyl malonic acids, may be used as blowing agents. However, these compounds are not preferred as blowing agents.

The blowing agents d) are preferably used in quantities of 0.1 to 5 parts by weight, based on the weight of component b).

Outer-zone-enlarging zeolites and/or silica gels are preferably used as further auxiliaries d) in the process according to the invention.

Any aromatic polyisocyanates having an NCO content of at least 20% by weight are suitable to be used as the polyisocyanate component a). Examples include 2,4-diisocyanatotoluene, technical mixtures thereof with 2,6-diisocyanatotoluene, or, preferably, known polyisocyanates or polyisocyanate mixtures of the diphenyl methane series which may be obtained, for example, by phosgenation of aniline/formaldehyde condensates and, optionally, working up of the phosgenation products by distillation. The polyisocyanates or polyisocyanate mixtures which are particularly suitable for the process according to the invention generally have a content of diisocyanatodiphenyl methane isomers of 50 to 100% by weight and, for the rest, consist essentially of higher homologs of these diisocyanates. The diisocyanates present in these mixtures consist essentially of 4,4'-diisocyanatodiphenyl methane in admixture with up to 60% by weight, based on the total quantity of diisocyanates, of 2,4'-diisocyanatodiphenyl methane and, optionally, small quantities of 2,2'-diisocyanatodiphenyl methane. Urethane-, carbodiimide- or allophanate-modified derivatives of these polyisocyanates may also be used as the polyisocyanate component a).

The reactive component b) is at least one organic compound containing at least two isocyanate-reactive groups. This component generally consists of mixtures of several such compounds. The individual compounds of component b) include, preferably, the organic polyhydroxyl compounds known per se from polyurethane chemistry.

Particularly suitable reactive components suitable for use as component b) include, for example, the polyhydroxypolyethers known per se with molecular weights in the range from 1,000 to 10,000 and preferably in the range from 1,500 to 6,000 which contain at least 2, preferably 2 to 6 and more preferably 2 to 3 hydroxyl groups of the type mentioned per molecule. Polyhydroxypolyethers such as these are obtained in known manner by alkoxylation of suitable starter molecules. Suitable starter molecules include, for example, water, propylene glycol, glycerol, trimethylol propane, sorbitol, cane sugar, aminoalcohols, such as, for example, ethanolamine or diethanolamine, or aliphatic amines, such as, for example, n-hexylamine or 1,6-diaminohexane, and mixtures thereof. Suitable alkoxylating agents include, in particular, propylene oxide and, optionally, ethylene oxide which may be used in admixture with propylene oxide, or even separately in separate reaction steps during the alkoxylation reaction. The OH value of these reactive components is in the range from 20 to 149, preferably in the range from 25 to 100 and more preferably in the range from 25 to 75.

The modification products known per se of such polyether polyols, i.e. the known graft polyethers based on the simple polyether polyols mentioned by way of example and the polyether polyols containing known polyadducts as fillers, for example polyether polyols containing polyhydrazocarbonamides as dispersed fillers, are also suitable.

The usual polyester polyols having molecular weights in the range from 1,000 to 10,000, preferably in the range from 1,500 to 4,000, and that contain at least 2, preferably 2 to 6 and more preferably 2 to 3 hydroxyl groups per molecule, are also suitable to be used as component b) or as part of component b). Suitable polyester polyols are the reaction products known per se of excess quantities of polyhydric alcohols of the type already mentioned hereinabove by way of example as starter molecules with polybasic acids, such as, for example, succinic acid, adipic acid, phthalic acid, tetrahydrophthalic acid or mixtures of such acids. The OH value is in the range from 25 to 149 and preferably in the range from 40 to 120.

Low molecular weight polyhydroxyl compounds, i.e. those having a molecular weight in the range from 62 to 999, are also suitable as part of component b). The polyhydroxyl compounds in question include, for example, the low molecular weight hydroxyfunctional chain extending or crosslinking agents known per se from polyurethane chemistry, such as, for example, alkane polyols of the type already mentioned hereinabove by way of example as starter molecules or even low molecular weight polyether polyols obtainable by alkoxylation of these starter molecules. Glycols such as, for example, ethylene glycol and butylene glycol, and ethanolamine and methyl ethanolamine are preferred.

As already mentioned, component b) preferably consists of organic polyhydroxyl compounds or of mixtures of organic polyhydroxyl compounds of the type mentioned by way of example, mixtures of the relatively high molecular weight polyhydroxyl compounds mentioned by way of example with the low molecular weight polyhydroxyl compounds mentioned by way of example, which may be used as chain extending agents, also being suitable for use as component b). These low molecular weight polyhydroxyl compounds may be present in a quantity of 0.5 to 15 parts by weight, preferably in a quantity of 1 to 10 parts by weight, based on 100 parts by weight of component b).

The reactive component b) may also consist, at least in part, of aminofunctional compounds. These aminofunctional compounds include, for example, aminopolyethers having a molecular weight in the range from 1,000 to 12,000, preferably in the range from 2,000 to 8,000, which contain at least two aliphatically and/or aromatically bound primary and/or secondary, preferably primary, amino groups and also low molecular weight polyamines having a molecular weight in the range from 60 to 999 as chain extending agents.

The aminopolyethers include those of the type mentioned in, for example, European Patent 0,081,701, U.S. Pat. Nos. 3,654,370, 3,155,728, 3,236,895, 3,808,250, 3,975,428, 4,016,143, 3,865,791 and German Offenlegungsschrift 2,948,491, the disclosure of which are herein incorporated by reference. The low molecular weight polyamines include, for example, aliphatic polyamines, such as ethylene diamine, 1,6-diaminohexane and, preferably, aromatic polyamines, more particularly alkyl-substituted phenylene diamines, such as 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane, 3,5-diethyl-3',5'-diisopropyl-4,4'-diaminodiphenyl methane or mixtures thereof.

In the practical application of the process according to the invention, the hereinabove described organic compounds which correspond to formulae I and/or II and are crucial to the invention, may also be used in combination with small quantities of other chemical or physical blowing agents known per se, including water, gases physically dissolved in the starting components, such as, for example, air, carbon dioxide or nitrogen, pyrocarbonic acid esters, and nitrogen-eliminating compounds. However, apart from the often unavoidable use of water and air stirred in, the use of additional blowing agents such as these is not preferred. If they are present at all, these other blowing agents generally make up at most 50% by weight and preferably at most 25% by weight of all the blowing agents present in the reaction mixture.

The activators c) used include, for example, catalysts known per se for urea and/or urethane formation which accelerate the isocyanate polyaddition reaction, such as, for example, tertiary amines, including, for example, triethylene diamine, N,N-dimethylbenzyl amine or N,N-dimethyl cyclohexyl amine; and organometallic compounds, more particularly tin compounds, such as, for example, tin(II) octoate or dibutyl tin dilaurate.

Auxiliaries and additives e) optionally used include, for example, the foam stabilizers known per se, such as, for example, those based on polyether-modified polysiloxanes, and chain-extending agents. Chain extending agents are generally used in quantities of 0.5 to 15 parts by weight and preferably in quantities of 1 to 10 parts by weight, based on 100 parts by weight of reactive component b).

Other auxiliaries and additives e) which may optionally be used include, for example, internal mold release agents such as, for example, those of the type described in European Patent 0,081,701; U.S. Pat. No. 3,726,952; British Patent 1,365,215; U.S. Pat. Nos. 4,098,731, 4,058,492; German Offenlegungsschrift 2,319,648; U.S. Pat. Nos. 4,033,912, 4,024,090; German Offenlegungsschrift 2,427,273; and U.S. Pat. No. 4,098,731, the disclosures of which are herein incorporated by reference.

The process according to the invention is generally carried out by mixing starting components b) to f) beforehand, and then combining the resultant mixture with polyisocyanate component a). The mixing step is carried out, for example, in stirred mixers or preferably in the usual high-pressure mixing units of the type normally used in the production of polyurethane foams. Immediately after the reaction mixture has been prepared, and the mold is filled, with the quantity of reaction mixture being introduced into the mold adapted to the required density of the moldings.

In addition to this one-step process, the process according to the invention may also be carried out using the semiprepolymer principle. In this case, the total quantity of polyisocyanate component a) is reacted with part of component b), for example at an NCO:OH equivalent ratio of at least 3:1 and preferably of at least 8:1 to form an NCO semi-prepolymer which is then reacted with a mixture of the remaining components b) to f). The NCO semiprepolymers may of course also be produced using polyhydroxyl compounds b) which are different from the polyhydroxyl compounds b) that are subsequently mixed with the NCO semiprepolymers.

In all variations of the process according to the invention, the quantities in which the individual components are used are selected in such a way that an isocyanate index of 75 to 200 and preferably 80 to 150 is maintained. The "isocyanate index" is understood to be the quotient of the number of isocyanate groups divided by the number of isocyanate-reactive groups multiplied by 100.

The moldings produced from this process have a density of at least 120 kg/m$^3$, and preferably in the range from 150 to 1000 kg/m$^3$.

The molds used generally have a temperature of at least 30° C., and preferably of at least 40° C. If necessary, the inner walls of the molds may be coated with external mold release agents known per se, before filling with the reaction mixture.

The process according to the invention enables high-quality polyurethane foam moldings having a compact, bubble-free surface skin to be produced without the use of the chlorofluorocarbons hitherto always used as blowing agents. The process according to the invention is particularly suitable for the production of flexible to semirigid integral foams having a compact surface skin of the type widely used in the automotive and furniture industries.

Surprisingly, only the organic carboxylic acids corresponding to formulae I and/or II used as blowing agents d) show the outstanding effects in comparison with the prior art blowing agents. The oleic acid, for example, used in European Patent Application 240,715 does not show these favorable blowing effects. Besides, monofluorotrichloromethane was also used as blowing agent in this document. The release agent components disclosed in, for example, European Patent Application 240,715, such as acetic acid, propionic acid, succinic acid, glutaric acid, adipic acid, have a much poorer effect as blowing agents, and oxalic acid forms carbon monoxide. The lactic acid known as a blowing agent from European Patent Application 372,292 is surprisingly inferior to the blowing agents described hereinabove in accordance to the present invention. The same applies to the blowing agents known from U.S. Pat. No. 5,162,385, such as acetic acid, propionic acid and ricinoleic acid. Even the carboxylic acid blowing agents used in German Auslegeschrift 4,028,211 together with the polyisocyanurate catalysts disclosed in that document and the special reactive components do not lead to flexible to semirigid polyurethane foam moldings having a compact surface skin.

The following examples further illustrate details for the process of this invention. The invention, which is set forth in the foregoing disclosure, is not to be limited either in spirit or in scope by these examples. Those skilled in the art will readily understand that known variations of the conditions of the following procedures can be used. Unless otherwise noted, all temperatures are degrees Celsius and all parts are parts by weight.

EXAMPLES

Starting Materials

Component a)

isocyanate a): a polyisocyanate based on polymeric diphenyl methane diisocyanate, having an NCO content of 28.5%, a viscosity of 130 mPa.s at 25° C., and prepared by mixing equal parts by weight of:

i) a polyisocyanate having an NCO content of 24.5%, a viscosity of 500 mPa.s at 25° C., and prepared by reacting a polymeric diphenylmethane diisocyanate with a polypropylene glycol having an OH number of 515, with ii) a polymeric diphenylmethane diisocyanate having an NCO content of 31.5% and comprising 60% by weight of isomeric diphenylmethane diisocyanates and 40% by weight of higher molecular weight polyphenyl polymethylene polyisocyanates.

Polyol Component b)

polyol 1): a trimethylol-propane-started polyether polyol based on propylene oxide and ethylene oxide, predominantly containing primary OH terminal groups; having an OH value of 35, and a molecular weight of 4,800 polyol 2): a propylene-glycol-started polyether polyol based on propylene oxide and ethylene oxide, predominantly containing primary OH terminal groups; having an OH value of 28, and a molecular weight of 6,000

Component c)

ULI® (Witco Corp.) is an activator having the structure of dibutyl tin bis-lauryl mercaptide

Additive Component e)

additive 1 ): ethanolamine
additive 2): ethylene glycol

The polyol mixtures listed in Table 1 are processed with the quantity of polyisocyanate component a) also shown in Table 1.

TABLE 1

(All figures are parts by weight)

| Components: | Example: | | | | | | | | | |
|---|---|---|---|---|---|---|---|---|---|---|
| | 1 | 2 | 3 | 4 | 5 | 6 | 7 | 8 | 9 | 10 |
| polyol 1) | 70 | 70 | 70 | 70 | 70 | 70 | 70 | 70 | 70 | 70 |
| polyol 2) | 30 | 30 | 30 | 30 | 30 | 30 | 30 | 30 | 30 | 30 |
| additive 1) | 1 | 1 | 1 | 1 | 1 | 1 | 1 | 1 | 1 | 1 |
| additive 2) | 0.43 | 0.8 | 0.75 | 2.5 | 1.1 | — | 2.5 | 2.5 | 2.5 | 0.55 |
| Water | — | — | — | — | — | — | — | — | — | 0.1 |
| c) | 0.6 | 0.5 | 1.5 | 0.5 | 0.7 | 3.5 | 0.3 | 0.5 | 1.0 | 0.25 |
| Malonic acid in additive 2), 1:1 | — | 3.4 | — | — | — | — | — | — | — | — |
| Citric acid in additive 2), 1:1 | — | — | 3.5 | — | — | — | — | — | — | — |
| Citric acid isopropyl ester | — | — | — | 2.63 | — | — | — | — | — | — |
| Lactic acid (90%) | — | — | — | — | 2.14 | — | — | — | — | — |
| Tartaric acid in additive 2), 1:1 | — | — | — | — | — | 5.0 | — | — | — | — |
| Acetic acid | — | — | — | — | — | — | 2.0 | — | — | — |
| Maleic acid in additive 2), 1:1 | — | — | — | — | — | — | — | — | — | 3.9 |
| Propionic acid | — | — | — | — | — | — | — | 2.47 | — | — |
| Oleic acid | — | — | — | — | — | — | — | — | 9.4 | — |
| isocyanate a) | 66 | 66 | 66 | 66 | 66 | 66 | 66 | 66 | 66 | 67 |
| Reduction in pressure [bar/min.] | 0.25 | 0.7 | 0.7 | 0.7 | *1) | *1) | *1) | *1) | *1) | 0.7 |
| Density [kg/m$^3$] | 189 | 155 | 190 | 197 | 270 | 275 | 253 | 319 | 395 | 200 |
| Gas yield, based on water | 1.0 | 1.22 | 0.99 | 0.96 | 0.70 | 0.69 | 0.75 | 0.59 | 0.48 | 0.94 |
| NCO index | 101 | 101 | 101 | 101 | 101 | 101 | 101 | 101 | 101 | 101 |
| Residence time in mold [mins.] | Post-3) expansion | 4$^{2)}$ | 4$^{2)}$ | 4$^{2)}$ | *1) | *1) | *1) | *1) | *1) | 4$^{2)}$ |
| Densiy range obtained [kg/m$^3$] | 500–600 | 250–700 | 400–800 | 350–800 | 700–800$^{4)}$ | 700–800$^{4)}$ | 700–800$^{4)}$ | 700–800$^{4)}$ | 700–800$^{4)}$ | 350–800 |

*1) No measurement; the mold was not filled because of inadequate gas yield
2) Dimensionally stable moldings
3) Considerable post-expansion after 4 minutes; still present even after 10 minutes
4) Poor blowing, greater compression necessary Plate-like foam moldings were produced using the formulations according to Table 1. The mold used was a plate mold measuring 10×200×300 mm of which the inner walls had been coated with a commercial external wax-based release agent (®Acmosil 180, a product of Acmos, Bremen).

The reaction mixtures were prepared from the hereinabove described polyol mixtures and polyisocyanate component a) using a typical stirred mixer.

To define the blowing characteristic, the gas yield according to Table 1 was measured in the non-compressed foams on the basis of their density.

The tests show that, in the case of semirigid to flexible foams, the blowing properties of the blowing agents used in accordance with the invention are better than the prior art. In the case of rigid foams with a compact surface skin, the blowing properties and other properties of the blowing agents used in accordance with the invention are at least as good as the prior art.

It can be seen from Table 1 that the use of malonic acid (Example 2), citric acid (Example 3) and citric acid isopropyl ester (Example 4) as blowing agents are distinctly superior to the effect of other carboxylic acids and can even clearly surpass water with regard to gas yield, as shown in Example 2 by comparison with Example 1. Another surprising aspect was the rapid reduction in pressure in moldings which was reflected in remarkably short in-mold residence times for acid-containing systems. To this end, the time required to achieve dimensional stability was determined for the formulations according to Table 1 by removal from the mold, the density initially being adjusted to 670 kg/m$^3$. In Examples 2 to 4 and 10, the moldings foamed with the blowing agents according to the invention were smoothly demolded after 4 minutes whereas the molding according to Example I split under the effect of considerable post-expansion.

The optimization of catalysis in Examples 2 to 4 and 10 provides for even shorter in-mold residence times because the flow behavior allows this. An extremely low increase in viscosity was produced by malonic acid in Example 2. This is also reflected in mixtures with other blowing agents according to the invention.

Examples 2 to 4 and 10 surprisingly correspond in their pressure reduction to a comparison in which 15 parts by weight monofluorotrichloromethane were used as the blowing agent and 2.5 parts by weight ethylene glycol were used for otherwise the same formulation and a reduction of 0.7 bar per minute was obtained whereas Example 1 showed a reduction of 0.25 bar per minute. The other acids (Examples 5 to 9) are unsuitable because they do not fill the predetermined volume of the molds owing to a poor gas yield.

On the basis of formulations 2 to 4, conventional steering wheel molds with a steel ring insert were filled with the reaction mixtures, followed after 4 minutes by demolding. The steering wheels did not show any flow defects and had a cell-free outer zone with the typical flexible surface hardness of a chlorofluorocarbon-blown semirigid steering wheel.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane foam moldings having a compact surface and a density of at least 150 kg/m$^3$ comprising foaming a reaction mixture comprising
   a) a polyisocyanate component comprising at least one aromatic polyisocyanate,
   b) an isocyanate-reactive component comprising at least one organic compound containing at least two isocyanate-reactive groups,
   c) urethane- and urea-forming activators, and
   d) at lease one organic blowing agent,
   inside a mold while maintaining an isocyanate index of 75 to 200 throughout the reaction, wherein said organic blowing agent comprises a compound selected from the group consisting of
   1) compounds corresponding to formula I:

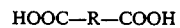

HOOC—R—COOH     I wherein: R represents a CH$_2$ group or a CH=CH group;
   2) compounds corresponding to formula II

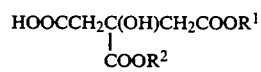

HOOCCH$_2$C(OH)CH$_2$COOR$^1$     II
   |
   COOR$^2$ wherein: R$^1$ and R$^2$ independently of one another represent either a hydrogen atom or a C$_{1-6}$ alkyl radical of which the hydrogen atoms may be partly substituted by OH groups; and
   3) mixtures thereof.

2. The process of claim 1 wherein said reaction mixture additionally comprises e) auxiliary agents and additives.

3. The process of claim 1 wherein said reaction mixture additionally comprises f) water.

4. The process of claim 1, wherein said blowing agent comprises malonic acid.

5. The process of claim 1, wherein said blowing agent comprises citric acid.

6. The process of claim 1, wherein said blowing agent comprises citric acid propyl ester.

7. The process of claim 1, wherein said blowing agent comprises citric acid hydroxypropyl ester.

8. The process of claim 1, wherein said blowing agent comprises maleic acid.

9. The process of claim 1, wherein said blowing agent comprises at least two compounds selected from the group consisting of malonic acid, citric acid, maleic acid, citric acid propyl ester and citric acid hydroxypropyl ester.

10. The process of claim 1, wherein said blowing agent corresponds to said formula (II) wherein R$^1$ represents a C$_{1-6}$ alkyl radical, of which the hydrogen atoms may be partly substituted by OH groups, and R$^2$ represents a hydrogen atom.

11. The process of claim 1, wherein said reaction mixture comprises from 0.1 to 5.0 parts by weight, based on the total weight of said isocyanate-reactive component, of said blowing agent.

12. The process of claim 1, wherein said blowing agents corresponding to said formulas I and II are in the form of their alkanolamine salts.

13. The process of claim 2, wherein said auxiliary agents comprise outer-zone-enlarging zeolites and/or silica gels.

* * * * *